(12) United States Patent
Kojima et al.

(10) Patent No.: US 12,311,647 B2
(45) Date of Patent: May 27, 2025

(54) SHEET PROCESSING APPARATUS

(71) Applicants: Akira Kojima, Kanagawa (JP); Toshihiro Shimada, Tokyo (JP)

(72) Inventors: Akira Kojima, Kanagawa (JP); Toshihiro Shimada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 329 days.

(21) Appl. No.: 18/153,564

(22) Filed: Jan. 12, 2023

(65) Prior Publication Data

US 2023/0249446 A1 Aug. 10, 2023

(30) Foreign Application Priority Data

Feb. 7, 2022 (JP) ................. 2022-017209

(51) Int. Cl.
| | | |
|---|---|---|
| B32B 37/00 | (2006.01) | |
| B32B 37/18 | (2006.01) | |
| B65H 3/06 | (2006.01) | |
| B65H 39/04 | (2006.01) | |
| B65H 41/00 | (2006.01) | |

(52) U.S. Cl.
CPC ........... *B32B 37/0053* (2013.01); *B65H 3/06* (2013.01); *B65H 39/04* (2013.01); *B65H 41/00* (2013.01); *B32B 2037/0061* (2013.01); *B32B 37/185* (2013.01); *B65H 2402/30* (2013.01); *B65H 2402/441* (2013.01)

(58) Field of Classification Search
CPC ......... B32B 2037/0061; B32B 37/185; B32B 37/0053; B65H 2402/441
See application file for complete search history.

(56) References Cited

U.S. PATENT DOCUMENTS

| | | | | |
|---|---|---|---|---|
| 6,315,020 | B1 * | 11/2001 | Seki ...................... | B32B 37/226 156/364 |
| 2002/0074090 | A1 * | 6/2002 | Osumi ................ | B32B 38/1825 156/577 |
| 2002/0117266 | A1 * | 8/2002 | Han ...................... | B32B 37/226 156/583.1 |
| 2003/0209331 | A1 * | 11/2003 | Worth ................... | B32B 37/226 156/555 |
| 2020/0247636 | A1 * | 8/2020 | Furuhashi ............ | B65H 29/125 |

FOREIGN PATENT DOCUMENTS

JP 2020-121868 8/2020

* cited by examiner

*Primary Examiner* — Carson Gross
(74) *Attorney, Agent, or Firm* — Harness, Dickey & Pierce, P.L.C.

(57) ABSTRACT

A sheet processing apparatus includes a sheet processing unit, a sheet feeder, and a unit cover. The sheet processing unit inserts an inner sheet into a two-ply sheet in which two sheets are overlapped and bonded together at one ends as a bonding portion. The sheet feeder is disposed above the sheet processing unit and is movable to open to expose the sheet processing unit. The sheet feeder feeds one of the two-ply sheet and the inner sheet. The unit cover is disposed above the sheet processing unit and opens to expose the sheet processing unit.

12 Claims, 6 Drawing Sheets

SHEET PROCESSING APPARATUS

CROSS-REFERENCE TO RELATED APPLICATION

This patent application is based on and claims priority pursuant to 35 U.S.C. § 119 (a) to Japanese Patent Application No. 2022-017209, filed on Feb. 7, 2022, in the Japan Patent Office, the entire disclosure of which is hereby incorporated by reference herein.

BACKGROUND

Technical Field

Embodiments of the present disclosure relate to a sheet processing apparatus.

Background Art

Sheet lamination is a technique that processes a two-ply sheet by inserting a desired inner sheet into the two-ply sheet having two sheets that are joined at one ends and applying heat and pressure to the two-ply sheet to bond the two sheets of the two-ply sheet at the one ends, so that the inner sheet inside the two-ply sheet is sandwiched by the two sheets of the two-ply sheet. For example, a known sheet processing apparatus has the configuration in which two sheets of a two-ply sheet are separated to insert an inner sheet between the two sheets of the two-ply sheet.

SUMMARY

Embodiments of the present disclosure described herein provide a novel sheet processing apparatus including a sheet processing unit, a sheet feeder, and a unit cover. The sheet processing unit inserts an inner sheet into a two-ply sheet in which two sheets are overlapped and bonded together at one ends as a bonding portion. The sheet feeder is disposed above the sheet processing unit and is movable to open to expose the sheet processing unit. The sheet feeder feeds one of the two-ply sheet and the inner sheet. The unit cover is disposed above the sheet processing unit and opens to expose the sheet processing unit.

BRIEF DESCRIPTION OF THE SEVERAL VIEWS OF THE DRAWINGS

Exemplary embodiments of this disclosure will be described in detail based on the following figures, wherein.

Figure 1:
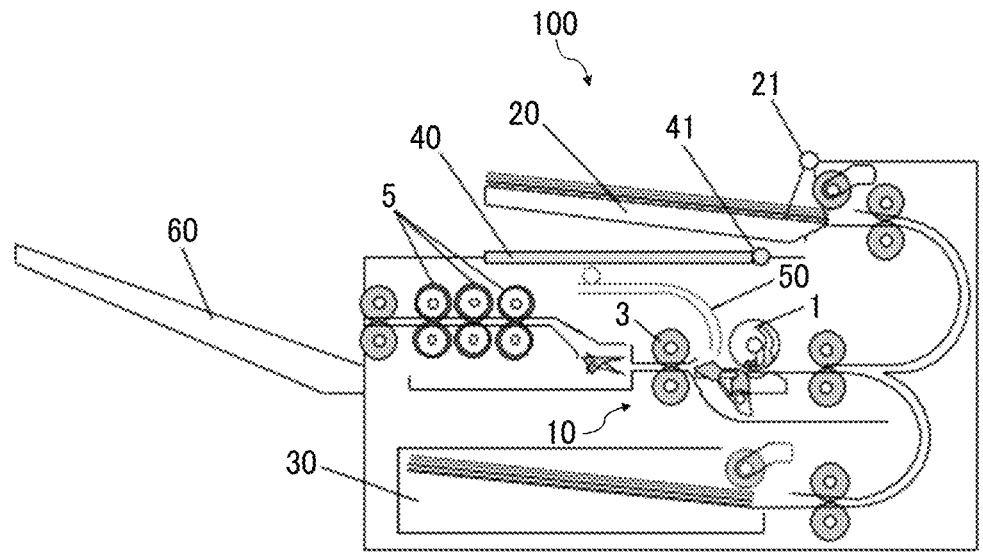
FIG. 1 is a diagram illustrating a configuration of a sheet processing apparatus according to Embodiment 1 of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

A description is given of a sheet processing apparatus and an image forming system incorporating the sheet processing apparatus according to an embodiment of the present disclosure with reference to the drawings attached. Note that elements (for example, mechanical parts and components) having the same functions and shapes are denoted by the same reference numerals throughout the specification and redundant descriptions are omitted.

An aspect of a sheet processing apparatus according to an embodiment of the present disclosure includes a sheet processing unit (sheet processing unit 10), a sheet feeder (first sheet tray 20), and a unit cover (jam handling cover 40). The sheet processing unit inserts an inner sheet into a two-ply sheet in which two sheets are overlapped and bonded together at one ends as a bonding portion. The sheet feeder is disposed above the processing unit and feeds one of the two-ply sheet and the inner sheet. The sheet feeder is movable to open the sheet processing unit. The unit cover is disposed above the sheet processing unit and is to open to expose the sheet processing unit. The units in the parentheses are given as examples included in the configuration of the sheet processing apparatus in FIG. 1.

Detailed descriptions are given of embodiments of the present disclosure with reference to the drawings.

Embodiment 1

FIG. 1 is a diagram illustrating a configuration of a sheet processing apparatus according to Embodiment 1 of the present disclosure.

Figure 2:
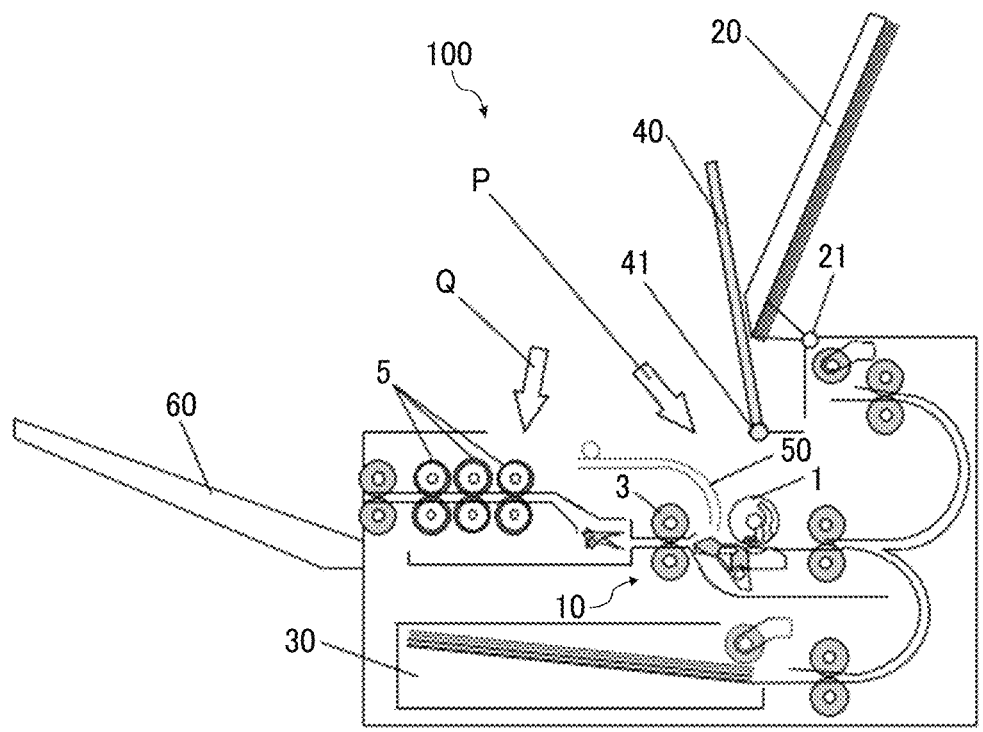
FIG. 2 is a diagram illustrating the sheet processing apparatus according to Embodiment 1 when the sheet processing apparatus performs paper jam handling.

FIG. 2 is a diagram illustrating the sheet processing apparatus according to Embodiment 1 when the sheet processing apparatus performs paper jam handling.

A sheet processing apparatus 100 includes a sheet processing unit 10, a first sheet tray 20 serving as a sheet feeder or a first sheet feeder, a second sheet tray 30 serves as another sheet feeder or a second sheet feeder, a jam handling cover 40 serving as a unit cover, a separation guide plate 50 serving as a separation guide, and a sheet ejection tray 60.

The sheet processing unit 10 separates a two-ply sheet (e.g., lamination film, pouch film) in which two sheets are overlapped and bonded together at one ends as a bonding portion and inserts an inner sheet (e.g., paper sheet, photo sheet) between the two sheets of the two-ply sheet. The sheet processing unit 10 includes a winding roller 1 and a fixing roller 5. The winding roller 1 and the parts around the winding roller 1 are included in an inner sheet inserter (or an inserter). The fixing roller 5 and the parts around the fixing roller 5 are included in a fixing laminator.

The inner sheet is inserted into the two sheets of the two-ply sheet in the inner sheet inserter.

A sheet laminating operation is performed in the fixing laminator to fix the two-ply sheet.

The first sheet tray 20 contains and feeds one of the two-ply sheet and the inner sheet.

The second sheet tray 30 contains and feeds the other of the two-ply sheet and the inner sheet.

In the following descriptions, the first sheet tray 20 contains and feeds the two-ply sheet and the second sheet tray 30 contains and feeds the inner sheet. However, the sheet processing apparatus according to the present disclosure is applicable to the configuration in which the first sheet tray 20 contains and feeds the two-ply sheet and the second sheet tray 30 contains and feeds the inner sheet and the configuration in which the first sheet tray 20 contains and feeds the inner sheet and the second sheet tray 30 contains and feeds the two-ply sheet.

Unless otherwise specified, each of the two-ply sheet and the inner sheet is referred to as a "sheet" appropriately. Further, the two-ply sheet may be referred to as a "film" and the inner sheet may be referred to as an "inner paper material".

The jam handling cover 40 covers the sheet processing unit 10.

The separation guide plate 50 guides one of the separated two films of the two-ply sheet to the open position.

The first sheet tray 20 is supported by a rotational support 21. As illustrated in FIGS. 1 and 2, the first sheet tray 20 rotates in the clockwise direction to be lifted upward.

The jam handling cover 40 is supported by a rotational support 41. Like the first sheet tray 20, the jam handling cover 40 rotates in the clockwise direction to open the space above the sheet processing unit 10. The user lifts the first sheet tray 20 and the jam handling cover 40 in this order, so that a relatively wide access path to the sheet processing unit 10 can be obtained.

An access path to the inner sheet inserter is indicated by an arrow P in FIG. 2 and is used to handle paper jam or other failures occurred in the area including the winding roller 1 in the sheet processing apparatus 100. According to this configuration, the inner sheet inserter having a complex mechanism can be opened, and the operability of the sheet processing apparatus 100 is enhanced.

An access path to the fixing laminator is indicated by an arrow Q in FIG. 2 and is used to handle paper jam or other failures occurred to the film after the inner sheet is inserted, in the area including the fixing laminator in the sheet processing apparatus 100. According to this configuration, the fixing laminator that requires a cumbersome abnormal condition handling can be opened, and the operability of the sheet processing apparatus 100 is enhanced.

As described above, the sheet processing apparatus 100 includes the jam handling cover 40 that can open and close with respect to the housing of the sheet processing apparatus 100 and the first sheet tray 20 that is movable with respect to the housing of the sheet processing apparatus 100. Due to the configuration, when compared with a known sheet processing apparatus that requires the user to have access to the inside of the apparatus through a relatively narrow space near the front of the sheet processing unit 10, the user can have access to the inside of the sheet processing apparatus 100 according to the present embodiment through a relatively wide space above the sheet processing apparatus 100. Accordingly, a good operability can be obtained when performing paper jam handling, maintenance, or other failure handling. For example, when the paper jam handling of a two-ply sheet or an inner sheet is to be performed from the front face of the apparatus, the user handles the paper jam from the front of the apparatus. At this time, the user puts the hand inside the apparatus through a significantly small space to have access to the winding roller 1 or an ejection roller pair 3, so that the film is wound and separated from the winding roller 1 or the ejection roller pair 3. In this case, the operability of the paper jam handling is significantly poor.

However, the sheet processing apparatus 100 according to the present embodiment can eliminate such an inconvenience.

The sheet processing apparatus 100 illustrated in FIGS. 1 and 2 has the configuration in which the first sheet tray 20 and the jam handling cover 40 rotate in the clockwise direction along the shaft perpendicular to the drawing sheet. However, the configuration of the sheet processing apparatus 100 is not limited to the configuration illustrated in FIGS. 1 and 2. For example, the first sheet tray 20, the jam handling cover 40, or both may rotate in the counterclockwise direction, may include a hinge at the far side from the user on the shaft parallel to the drawing sheet, or may slide in the left and right directions of the drawing sheet or the direction perpendicular to the drawing sheet to perform the paper jam handling.

Figure 3:
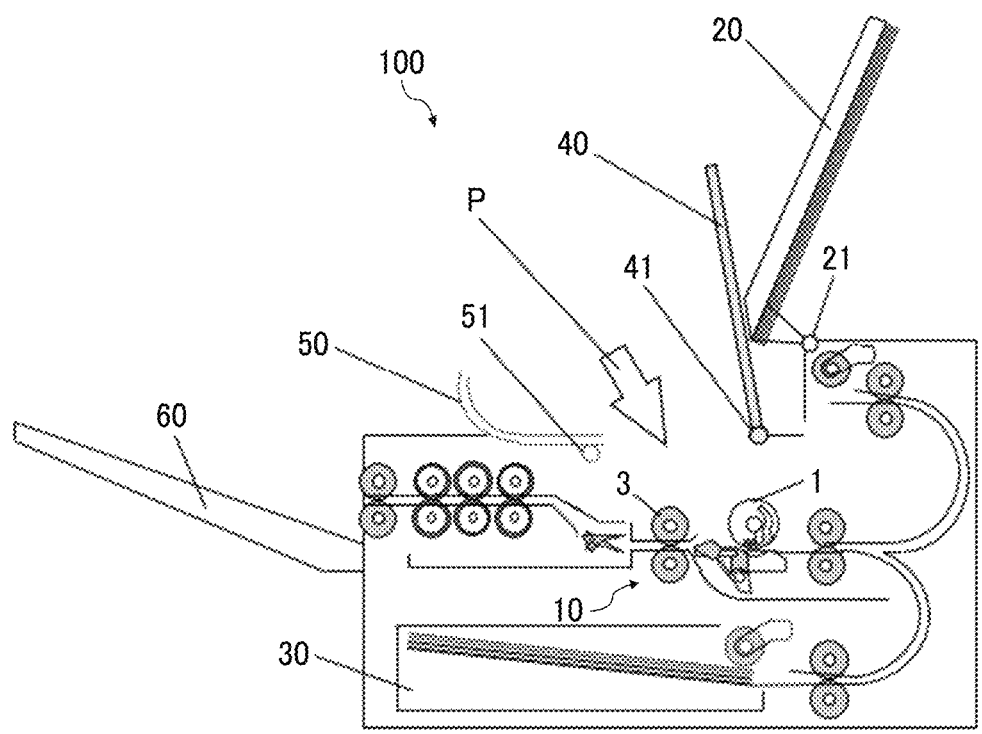
FIG. 3 is a diagram illustrating a separation guide plate included in the sheet processing apparatus according to Embodiment 1.

FIG. 3 is a diagram illustrating a separation guide plate included in the sheet processing apparatus 100 according to Embodiment 1.

The separation guide plate 50 is provided so that the sheet processing unit 10 (or a part of the sheet processing unit 10) can be opened. More specifically, the separation guide plate 50 is supported by a rotational support 51 and rotates in the counterclockwise direction to provide a wider access path to the inner sheet inserter as indicated by arrow P. Due to such a configuration, the user can perform the operation in the inner sheet inserter near the winding roller 1 more easily and handle the paper jam occurred at the ejection roller pair 3. As a result, the sheet processing apparatus 100 having a further excellent operability can be provided.

In the present embodiment, since the first sheet tray 20, the jam handling cover 40, and the separation guide plate 50 are rotatably supported by the respective rotational supports, the retraction of the first sheet tray 20 and the opening and closing of the jam handling cover 40 can be performed as a natural operation with a simple structure. As a result, the sheet processing apparatus 100 achieves the configuration with the further low cost and the excellent usability.

In addition, the sheet processing apparatus 100 includes the first sheet tray 20 disposed above the sheet processing unit 10 and the second sheet tray 30 disposed below the sheet processing unit 10. By so doing, the sheet processing apparatus 100 achieves a compact and space-saving configuration. Accordingly, the installation area of the sheet processing apparatus 100 can be reduced.

For example, in a sheet processing apparatus in which a sheet tray for one of a film sheet and an inner sheet is disposed above the sheet processing unit, if the second sheet tray is disposed on the right side of the apparatus in order to horizontally feed the other one of the film and the inner sheet from the right side of the apparatus, the whole width of the apparatus significantly increases. As illustrated in FIG. 1, the sheet processing apparatus 100 includes the second sheet tray 30 below the sheet processing unit 10 so as to have the same turn portion as the first sheet tray 20. By so doing, the whole width of the sheet processing apparatus 100 can be reduced.

Embodiment 2

A description is given of a sheet processing apparatus according to Embodiment 2 of the present disclosure.

The sheet processing apparatus of Embodiment 2 includes a jam handling cover modified based on the jam handling cover included in the sheet processing apparatus according to Embodiment 1.

Figure 4:
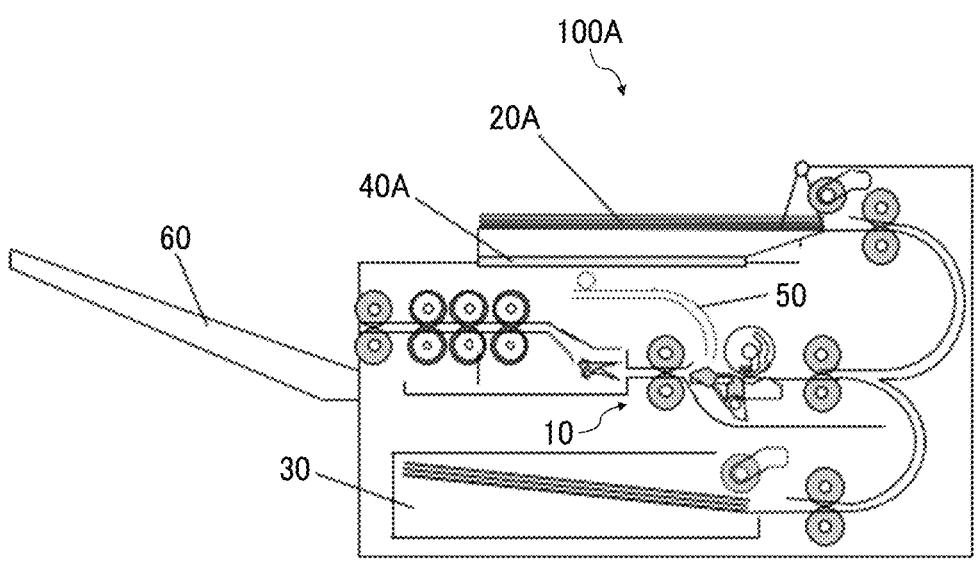
FIG. 4 is a diagram illustrating a configuration of a sheet processing apparatus according to Embodiment 2 of the present disclosure.

FIG. 4 is a diagram illustrating a configuration of a sheet processing apparatus according to Embodiment 2.

Figure 5:
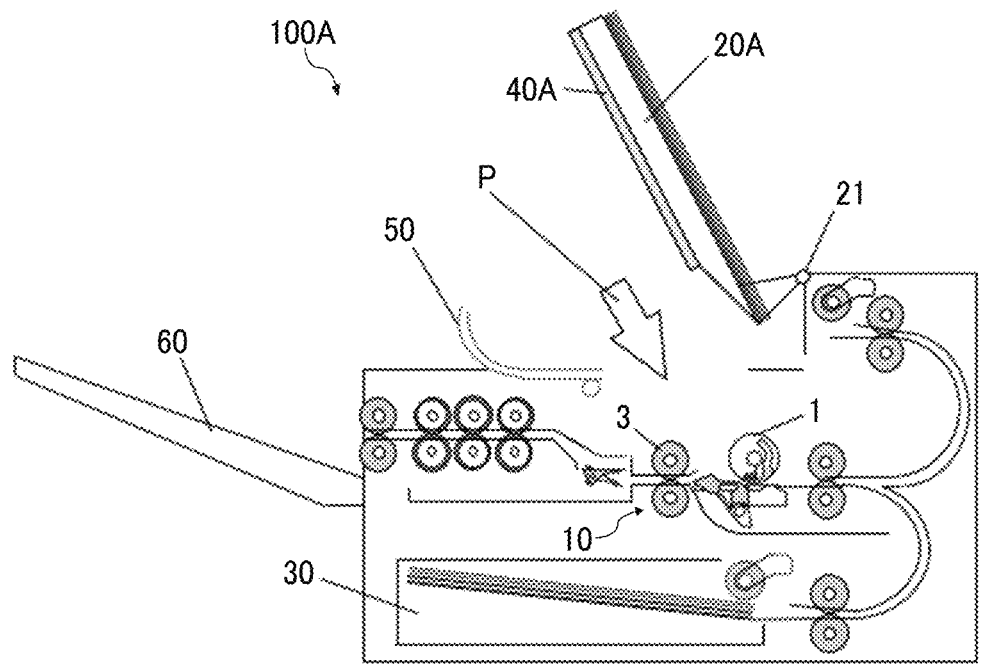
FIG. 5 is a diagram illustrating the sheet processing apparatus according to Embodiment 2, when the sheet processing apparatus performs paper jam handling at an inner sheet inserter.

FIG. 5 is a diagram illustrating the sheet processing apparatus according to Embodiment 2, when the sheet processing apparatus performs paper jam handling at an inner sheet inserter.

As illustrated in FIGS. 4 and 5, a sheet processing apparatus 100A according to the present embodiment includes a jam handling cover 40A and a first sheet tray 20A sharing the function as a unit cover with the jam handling cover 40A, so that the unit cover and the sheet feeder are integrated as a single unit. By so doing, the operability of the sheet processing apparatus 100A can be enhanced.

More specifically, the sheet processing apparatus 100A includes the first sheet tray 20A and the jam handling cover 40A that is integrally formed with the first sheet tray 20A. Due to such a configuration, when a paper jam occurs, the access path is given only by lifting the first sheet tray 20A. As a result, the operation can be easily done without duplication of effort. In addition, the number of hinges and other parts used for the rotational support of the jam handling cover 40A can be reduced when compared with the configuration in which the jam handling cover 40 and the first sheet tray 20 are separately disposed. As a result, the sheet processing apparatus 100A can achieve a reduction in the cost and weight.

Embodiment 3

A description is now given of a sheet processing apparatus according to Embodiment 3 of the present disclosure.

The sheet processing apparatus of Embodiment 3 has a modified opening function of the sheet processing unit 10 by a first sheet tray such as the first sheet tray 20 of Embodiment 1.

Figure 6:
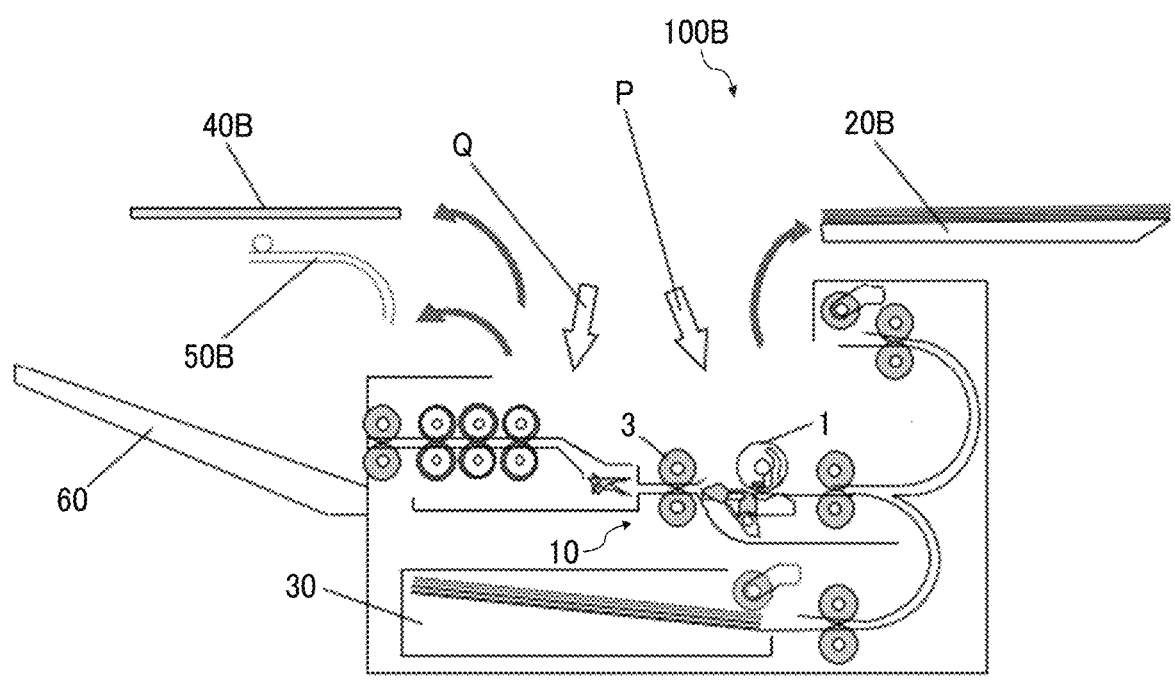
FIG. 6 is a diagram illustrating a configuration of a sheet processing apparatus according to Embodiment 3.

FIG. 6 is a diagram illustrating a configuration of a sheet processing apparatus according to Embodiment 3.

A sheet processing apparatus 100B according to Embodiment 3 includes a first sheet tray 20B, a jam handling cover 40B, and a separation guide plate 50B. The first sheet tray 20B, the jam handling cover 40B, and the separation guide plate 50B are detachably attachable to the sheet processing apparatus 100B. Due to such a configuration, when the paper jam handling is performed, the top of the sheet processing apparatus 100B can be widely opened due to a simple structure and a small number of parts and components, so that the user can easily have access to the jammed sheet and a further excellent jam handling performance can be achieved.

In FIG. 6, the three members, which are the first sheet tray 20B, the jam handling cover 40B, and the separation guide plate 50B, are detachably attachable to the sheet processing apparatus 100B. However, at least one of the first sheet tray 20B, the jam handling cover 40B, or the separation guide plate 50B may be detachably attachable to the sheet processing apparatus 100B and the rest of the first sheet tray 20B, the jam handling cover 40B, and the separation guide plate 50B may be rotatable around the respective rotational supports. The sheet processing apparatus may include, for example, the first sheet tray 20 that is rotatable around the rotational support 21 as illustrated in FIG. 1, and the jam handling cover 40B and the separation guide plate 50B that are detachably attachable to the sheet processing apparatus, as illustrated in FIG. 6.

The present embodiment is explained based on the sheet processing apparatus 100 of Embodiment 1. However, the first sheet tray 20A, the separation guide plate 50, or both included in the sheet processing apparatus 100A of Embodiment 2 may be detachably attachable to the sheet processing apparatus 100. When the first sheet tray 20A is detachably attachable to the sheet processing apparatus 100, the unit cover can also be detachably attachable with respect to the sheet processing apparatus 100.

Embodiment 4

A description is now given of the sheet processing apparatus according to the present embodiment when restricting a sheet to be placed on the first sheet tray 20 or the first sheet tray 20A.

Figure 7:
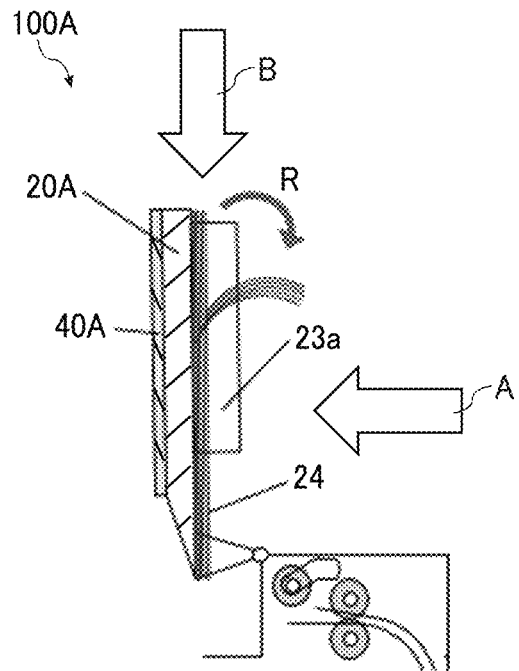
FIG. 7 is diagram illustrating a sheet processing apparatus in which a first sheet tray is widely opened and a sheet stands substantially vertically.

Referring to FIG. 7, the case of a sheet falling from the first sheet tray is described.

FIG. 7 is diagram illustrating a sheet processing apparatus in which the first sheet tray 20A is widely rotated from the state illustrated in FIG. 5 and a sheet stands substantially vertically.

FIG. 7 illustrates a cross section near the center in the width direction (the widthwise center) of the first sheet tray 20A. The width direction of the first sheet tray 20A indicates a direction orthogonal to a sheet conveyance direction in which a sheet is conveyed in the sheet processing apparatus. The configuration illustrated in FIG. 7A employs the first sheet tray 20A illustrated in FIG. 5. However, the first sheet tray 20 illustrated in FIG. 1 or the first sheet tray 20B illustrated in FIG. 6 may be employed.

The first sheet tray 20A is provided with a pair of side fences 23a and 23b (see FIG. 8) that guide and restrict the sheet ends parallel to the sheet conveyance direction of a sheet 24, in other words, the lateral registration of the sheet 24. In FIG. 7, the side fence 23a is disposed on the first sheet tray 20A near the trailing end of the sheet 24. However, since the side fence 23a does not restrict the flat surface of the sheet 24, it is likely that the trailing end of the sheet 24 bows downward in a direction as indicated by arrow R in FIG. 7 or that the sheet 24 falls off from the first sheet tray 20A to drop down, which may cause damage to the user.

Further, in the configurations illustrated in FIGS. 2, 3, 5, and 6 in addition to the condition illustrated in FIG. 7, the user needs to hold the first sheet tray 20 (FIGS. 2 and 3) or the first sheet tray 20A (FIGS. 5 and 7) or the first sheet tray 20B (FIG. 6) to stop the rotation of the first sheet tray 20 or the first sheet tray 20A when the paper jam handling is performed. Since the hand of the user is occupied to hold the first sheet tray 20 or the first sheet tray 20A or the first sheet tray 20B, the operability of the sheet processing apparatus 100 or the sheet processing apparatus 100A is likely to deteriorate.

Figure 8:
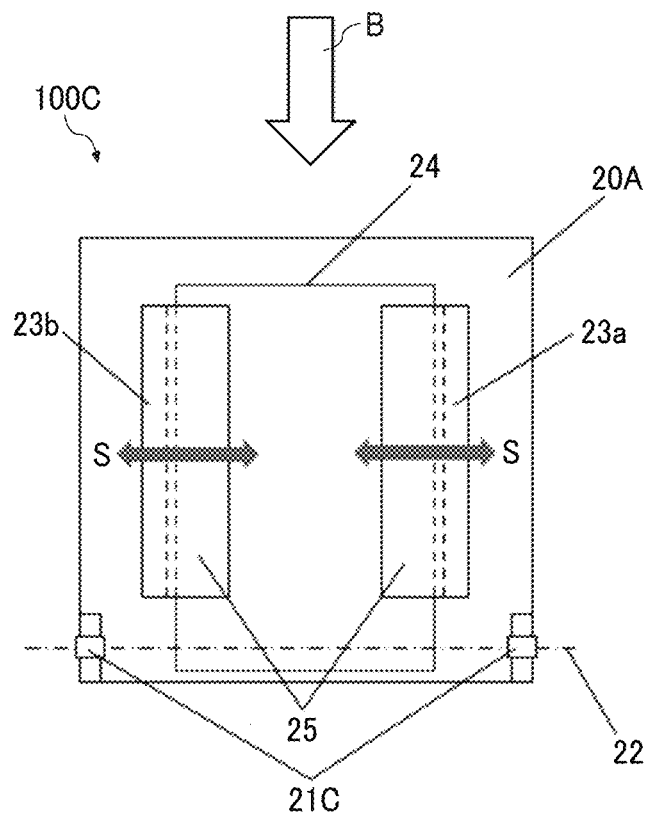
FIG. 8 is a plan view of the first sheet tray included in a sheet processing apparatus according to Embodiment 4 of the present disclosure.

FIG. 8 is a plan view of the first sheet tray included in a sheet processing apparatus according to Embodiment 4 of the present disclosure, viewed from a direction indicated by arrow A in FIG. 7.

Figure 9:
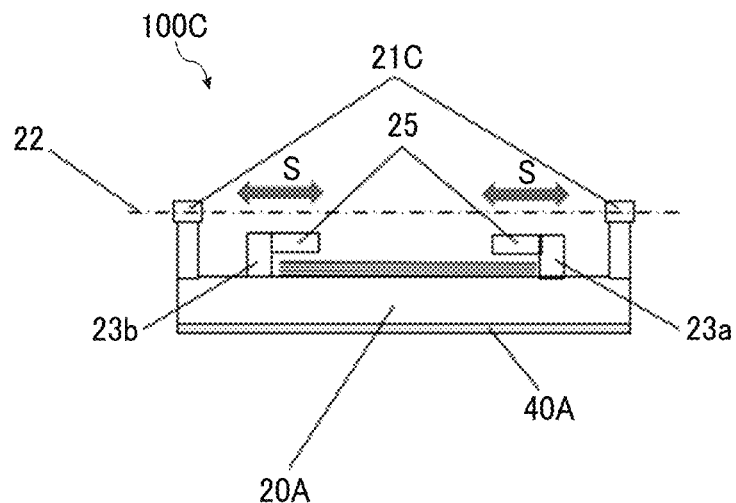
FIG. 9 is a side view of the first sheet tray included in the sheet processing apparatus according to Embodiment 4.

FIG. 9 is a side view of the first sheet tray included in the sheet processing apparatus according to Embodiment 4, viewed in a direction indicated by arrow B in FIG. 7.

The arrow B in FIG. 8 indicates the same direction as the arrow B in FIG. 7.

FIGS. 8 and 9 illustrate the area including the first sheet tray 20A of the sheet processing apparatus 100C, and areas outside this area are omitted.

The pair of side fences 23a and 23b on the first sheet tray 20A respectively move in the directions indicated by two bidirectional arrows in FIGS. 8 and 9 and are coupled by a gear train so that the pair of side fences 23a and 23b move symmetrically as illustrated in FIGS. 8 and 9.

In the present embodiment, the sheet processing apparatus 100C includes sheet holders 25 attached to the pair of side fences 23a and 23b to press the flat surface of the sheet 24. In FIGS. 8 and 9, when viewed from the front of the sheet processing apparatus 100C, one of the pair of side fences 23a and 23b on the far side is referred to as the side fence 23a and the other one of the pair of side fences 23a and 23b on the near side is referred to as the side fence 23b.

It is preferable that the sheet holders 25 are disposed to surround, for example, at least a part of the space above the sheet 24. It is more preferable that the sheet holders 25 are disposed to surround the sheet ends parallel to the sheet conveyance direction.

This configuration can prevent the trailing end of the sheet 24 from bowing or hanging downward as illustrated in FIG. 7, and further can prevent the sheet 24 from falling off from the first sheet tray 20A. As a result, the rotation range of the first sheet tray 20A can be increased, and the paper jam handling can be further prompted.

Further, it is preferable that the rotational support of the first sheet tray 20A may be a stopper to prevent the first sheet tray 20A from rotating due to the body weight. The sheet processing apparatus 100C according to the present embodiment includes a rotary shaft 22 and hinges each serving as a stopper. One of the hinges is disposed on the right side of the first sheet tray 20A and the other of the hinges is disposed on the left side of the first sheet tray 20A. The hinges of the first sheet tray 20A are torque hinges 21C that rotate around the rotary shaft 22. The action of the torque hinges 21C temporarily prevents the first sheet tray 20A from rotating in the falling direction due to the body weight, so that the rotation of the first sheet tray 20A can be temporarily stopped at an appropriate given angle. As a result, when performing the paper jam handling, the user does not need to constantly hold the first sheet tray 20A and can handle the paper jam with both hands. In addition, this configuration is effective to prevent an inconvenience that the user gets the hand caught by the first sheet tray 20A that falls (rotates) with great force due to the body weight.

The rotational support is not limited to the configuration with the torque hinges 21C as described in the present embodiment. The similar effect can be achieved with a mechanism in which the rotation of the first sheet tray 20A is temporarily prevented and is stopped at the given position. For example, a mechanism having the configuration using, for example, the function of a bending lever or the attracting force of a magnet can achieve the effect similar to the configuration using the torque hinges 21C.

A description now is given of another first sheet tray according to the present embodiment when preventing the sheet from falling from the first sheet tray.

Figure 10:
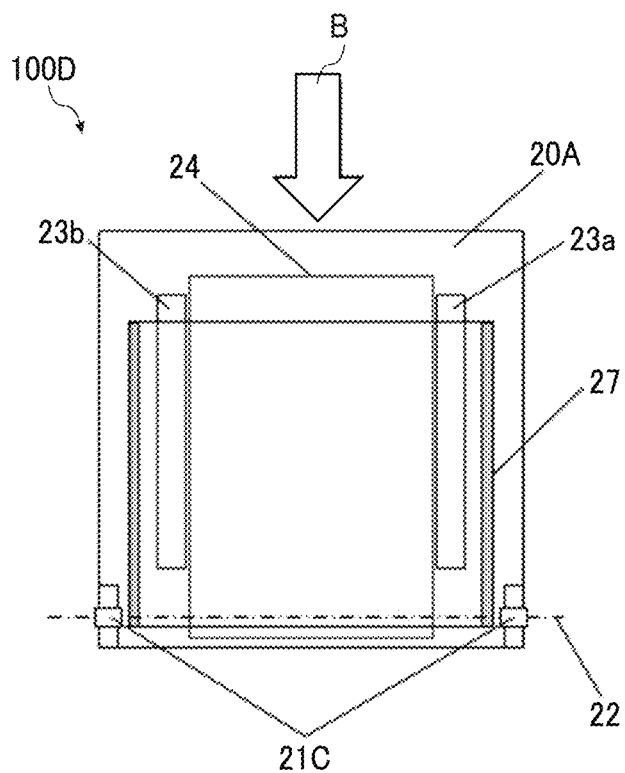
FIG. 10 is a plan view of another first sheet tray included in the sheet processing apparatus according to Embodiment 4 of the present disclosure.

FIG. 10 is a plan view of another first sheet tray included in the sheet processing apparatus according to Embodiment 4 of the present disclosure, viewed in the direction indicated by arrow A in FIG. 7.

Figure 11:
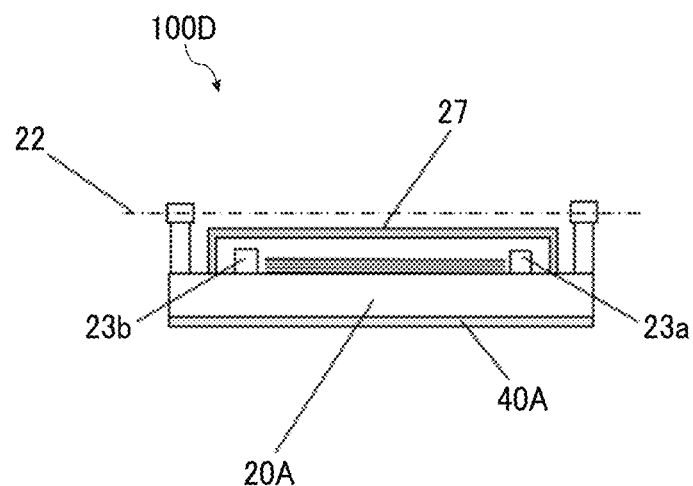
FIG. 11 is a side view of the first sheet tray of FIG. 10 included in the sheet processing apparatus according to Embodiment 4 of the present disclosure.

FIG. 11 is a side view of the first sheet tray of FIG. 10 included in the sheet processing apparatus according to Embodiment 4 of the present disclosure, viewed in the direction indicated by arrow B in FIG. 7.

The arrow B in FIG. 10 indicates the same direction as the arrow B in FIG. 7.

FIGS. 10 and 11 illustrate the area including the first sheet tray 20A of a sheet processing apparatus 100D, and areas outside this area are omitted.

The sheet processing apparatus 100D includes a sheet holding cover 27 attached to the first sheet tray 20A.

The sheet holding cover 27 has a U-shaped cross section as illustrated in FIG. 11 and is disposed so as to surround the entire area of the pair of side fences 23a and 23b and the sheet 24. Due to such a configuration, even when the first sheet tray 20A rotates close to the vertical position as illustrated in FIG. 7, the sheet ends of the sheet 24 can be prevented from bowing (hanging) downward and the sheet 24 from falling from the first sheet tray 20A.

Further, the sheet holding cover 27 is preferably made of a transparent material or a translucent material.

By so doing, the entire position of the sheet 24 can be visually grasped when the sheet 24 is set, the setting operation can be easily performed, and the effect of enhancing the operability of the sheet processing apparatus 100D can be achieved.

Further, the sheet holding cover 27 is attached to the first sheet tray 20A so that the sheet 24 can effectively be prevented from bowing (handing) downward. However, if the sheet holding cover 27 is not made to be transparent or translucent due to, for example, the cost, the leading end of the sheet 24 is hidden. This hiding of the leading end of the sheet 24 makes it difficult to know the degree of insertion of the sheet 24 when setting the sheet 24, and it is likely to impair the setting performance. In such a case, the shape of the sheet holding cover 27 may be arranged to facilitate the setting of the sheet 24.

Figure 12:
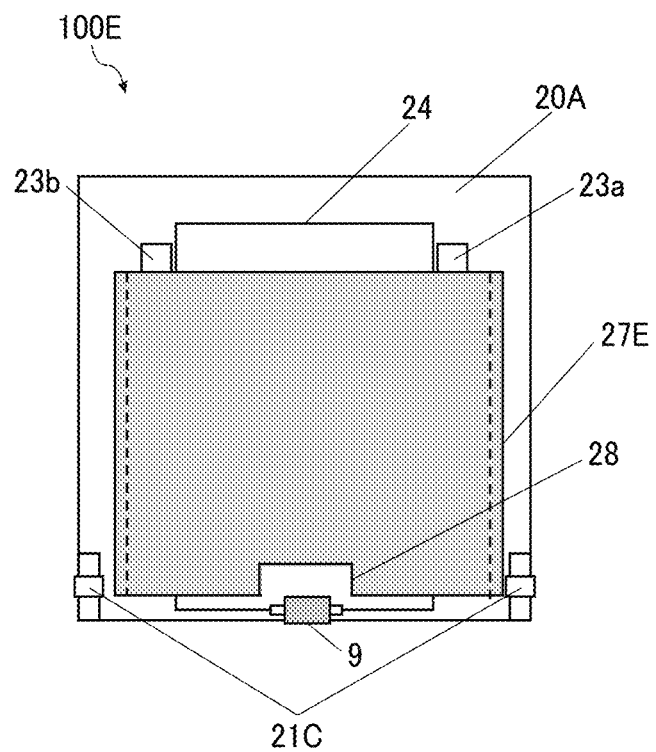
FIG. 12 is a plan view of a shape of a sheet holding cover.

FIG. 12 is a plan view of the shape of a sheet holding cover.

Figure 13:
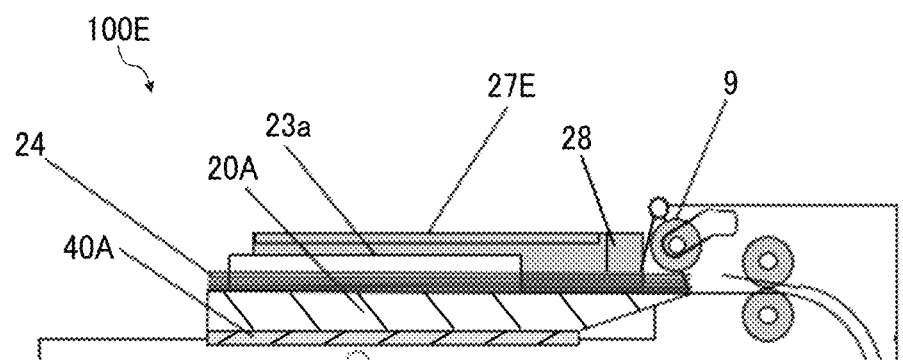
FIG. 13 is a cross-sectional view of the shape of the sheet holding cover of FIG. 12.

FIG. 13 is a cross-sectional view of the shape of the sheet holding cover of FIG. 12.

FIG. 12 is a plan view of the first sheet tray 20A, and FIG. 13 is a cross-sectional view of the area near the widthwise center of the first sheet tray 20A as viewed from the front of a sheet processing apparatus. FIGS. 12 and 13 illustrate the area including the first sheet tray 20A of a sheet processing apparatus 100E, and areas outside this area are omitted.

In FIG. 12, a cutout 28 having a recessed shape is formed in the lower side of a sheet holding cover 27E. As a result, the user can directly view the area in the vicinity of the leading end of the sheet 24 and a sheet feed roller 9 serving as a conveyance roller that grips the leading end of the sheet 24. Due to such a configuration, even when the sheet 24 is surrounded by the sheet holding cover 27E, the user can grasp the relation of the position of the leading end of the sheet 24 and, for example, the sheet feed roller 9, and the sheet 24 can be easily set while checking the degree of insertion of the sheet 24 when setting the sheet 24.

In the present embodiment, the configuration of the first sheet tray 20A included in the sheet processing apparatus 100A according to Embodiment 2 is described with reference to FIGS. 8 to 13. However, the configuration of the present embodiment can be similarly applied to the first sheet tray 20 of the sheet processing apparatus 100 according to Embodiment 1 and the first sheet tray 20B of the sheet processing apparatus 100B according to Embodiment 3.

Note that the present disclosure is not limited to the above-described embodiments. Within the scope of the present disclosure, those skilled in the art may change, add, or convert each element of the above-described embodiments. Moreover, a plurality of embodiments described above may be combined.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A sheet processing apparatus comprising:
   a sheet processing unit configured to insert an inner sheet into a two-ply sheet in which two sheets are overlapped and bonded together at one ends as a bonding portion;
   a sheet feeder disposed above the sheet processing unit and movable to open to expose the sheet processing unit, the sheet feeder being configured to feed one of the two-ply sheet and the inner sheet; and
   a unit cover disposed above the sheet processing unit and configured to open to expose the sheet processing unit.

2. The sheet processing apparatus according to claim 1, further comprising another sheet feeder disposed below the sheet processing unit and configured to feed the other of the two-ply sheet and the inner sheet.

3. The sheet processing apparatus according to claim 1, wherein the sheet processing unit includes
   an inner sheet inserter configured to insert the inner sheet between the two sheets of the two-ply sheet; and
   a fixing laminator configured to fix lamination of the inner sheet to the two-ply sheet, and
   wherein at least one of the sheet inserter or the fixing laminator is exposed along with movement of the sheet feeder.

4. The sheet processing apparatus according to claim 1, further comprising a separation guide configured to guide one of the two sheets of the two-ply sheet separated from each other,
   wherein the separation guide is openable to expose the sheet processing unit.

5. The sheet processing apparatus according to claim 4, wherein at least one of the sheet feeder, the unit cover, or the separation guide is rotatably supported by the sheet processing apparatus.

6. The sheet processing apparatus according to claim 4, wherein at least one of the sheet feeder, the unit cover, or the separation guide is detachably attached to the sheet processing apparatus.

7. The sheet processing apparatus according to claim 1, wherein the unit cover is integrated with the sheet feeder as a single unit.

8. The sheet processing apparatus according to claim 1, wherein the sheet feeder includes a stopper that prevents the sheet feeder from rotating due to a body weight of the sheet feeder.

9. The sheet processing apparatus according to claim 1, wherein the sheet feeder includes a pair of side fences that restricts ends of the one of the two-ply sheet and the inner sheet, the ends being parallel to a sheet conveyance direction in which the one of the two-ply sheet and the inner sheet is conveyed, and
wherein the pair of side fences covers at least a part of a surface of the one of the two-ply sheet and the inner sheet.

10. The sheet processing apparatus according to claim 1, wherein the sheet feeder includes a sheet holding cover covering at least a part of a surface of the one of the two-ply sheet and the inner sheet.

11. The sheet processing apparatus according to claim 10, wherein the sheet holding cover is made of a transparent material.

12. The sheet processing apparatus according to claim 11, wherein the sheet feeder further includes a conveyance roller configured to convey the one of the two-ply sheet and the inner sheet, and
wherein the sheet holding cover has a cutout in a vicinity of the conveyance roller.

\* \* \* \* \*